United States Patent
Gremillion et al.

(10) Patent No.: US 12,409,019 B2
(45) Date of Patent: Sep. 9, 2025

(54) ORTHODONTIC DEVICE STORAGE SYSTEM

(71) Applicant: DS GCC, LLC, Austin, TX (US)

(72) Inventors: Dallas Gremillion, Austin, TX (US); Shane W. Whisenant, Austin, TX (US)

(73) Assignee: DS GCC, LLC, Austin, TX (US)

( * ) Notice: Subject to any disclaimer, the term of this patent is extended or adjusted under 35 U.S.C. 154(b) by 0 days.

(21) Appl. No.: 18/612,681

(22) Filed: Mar. 21, 2024

(65) Prior Publication Data
US 2024/0315820 A1    Sep. 26, 2024

Related U.S. Application Data

(60) Provisional application No. 63/453,914, filed on Mar. 22, 2023.

(51) Int. Cl.
*A61C 19/02*    (2006.01)

(52) U.S. Cl.
CPC .................. *A61C 19/02* (2013.01)

(58) Field of Classification Search
CPC ....... A61C 7/08; A61C 19/02; A61C 2202/00; A61C 19/10; A45D 44/20
USPC .................. 206/37.4, 37, 63.5, 5, 368
See application file for complete search history.

(56) References Cited

U.S. PATENT DOCUMENTS

| | | | | |
|---|---|---|---|---|
| 2,435,032 A * | 1/1948 | Campbell | ................ | A45C 1/06 206/38.1 |
| 4,290,522 A * | 9/1981 | Takasaki | ................ | B60R 7/05 206/5 |
| 4,465,179 A * | 8/1984 | Miller | ................ | A45C 11/16 206/37 |
| 4,760,920 A * | 8/1988 | Thomsen | ................ | A45C 11/16 206/495 |
| 5,490,619 A * | 2/1996 | Boyar | ................ | A45F 3/02 224/613 |
| 6,170,651 B1 * | 1/2001 | Taormina | ................ | A45C 11/043 206/229 |
| 6,439,379 B2 * | 8/2002 | Taormina | ................ | A45C 11/043 206/229 |
| 6,808,066 B2 * | 10/2004 | Bean | ................ | A45D 1/00 206/349 |
| 6,923,313 B1 * | 8/2005 | Orogun-Thomas | ................ | A45C 11/043 206/5 |
| 8,151,399 B2 * | 4/2012 | Jones | ................ | A47L 25/00 15/210.1 |
| 8,590,698 B1 * | 11/2013 | Osborne | ................ | A45F 5/021 206/5 |
| 8,657,108 B2 * | 2/2014 | Nihei | ................ | A61B 50/00 206/63.5 |
| 2010/0181214 A1 * | 7/2010 | Brown | ................ | A61C 19/02 206/557 |
| 2014/0069063 A1 * | 3/2014 | Edmonds | ................ | A45C 11/24 53/473 |
| 2020/0022483 A1 * | 1/2020 | Pierce | ................ | A61C 19/02 |

(Continued)

*Primary Examiner* — Chun Hoi Cheung

(74) *Attorney, Agent, or Firm* — Banner & Witcoff, Ltd.

(57) ABSTRACT

A storage system for an orthodontic device is disclosed. The storage system includes a case having a first side, a second side engaged with the first side and forming an interior pocket between the first side and the second side. The storage system also includes a removal tool which includes a removal cloth engaged with the case. The removal tool includes a first pocket and a second pocket.

19 Claims, 8 Drawing Sheets

(56) References Cited

U.S. PATENT DOCUMENTS

2020/0093576 A1\* 3/2020 Cinader, Jr. ............. A61C 7/08

\* cited by examiner

ORTHODONTIC DEVICE STORAGE SYSTEM

CROSS REFERENCE TO RELATED APPLICATION(S)

This utility application claims priority to provisional application entitled Orthodontic Device Storage System, Ser. No. 63/453,914 filed Mar. 22, 2023 which is incorporated herein by reference.

TECHNICAL FIELD

This disclosure relates to storage systems for orthodontic devices for use with devices including aligners, retainers, mouthguards dentures and other orthodontic devices.

BACKGROUND

Many orthodontic devices exist and many of these orthodontic devices must be periodically removed from a user's mouth by the user. The user must then store the orthodontic device. A portable, reusable, and easy to use removal and storage system can help a user to remove and store their orthodontic devices.

DESCRIPTION OF THE DRAWINGS

To allow for a more full understanding of the present disclosure, it will now be described by way of example, with reference to the accompanying drawings in which.

DETAILED DESCRIPTION

Figure 1:
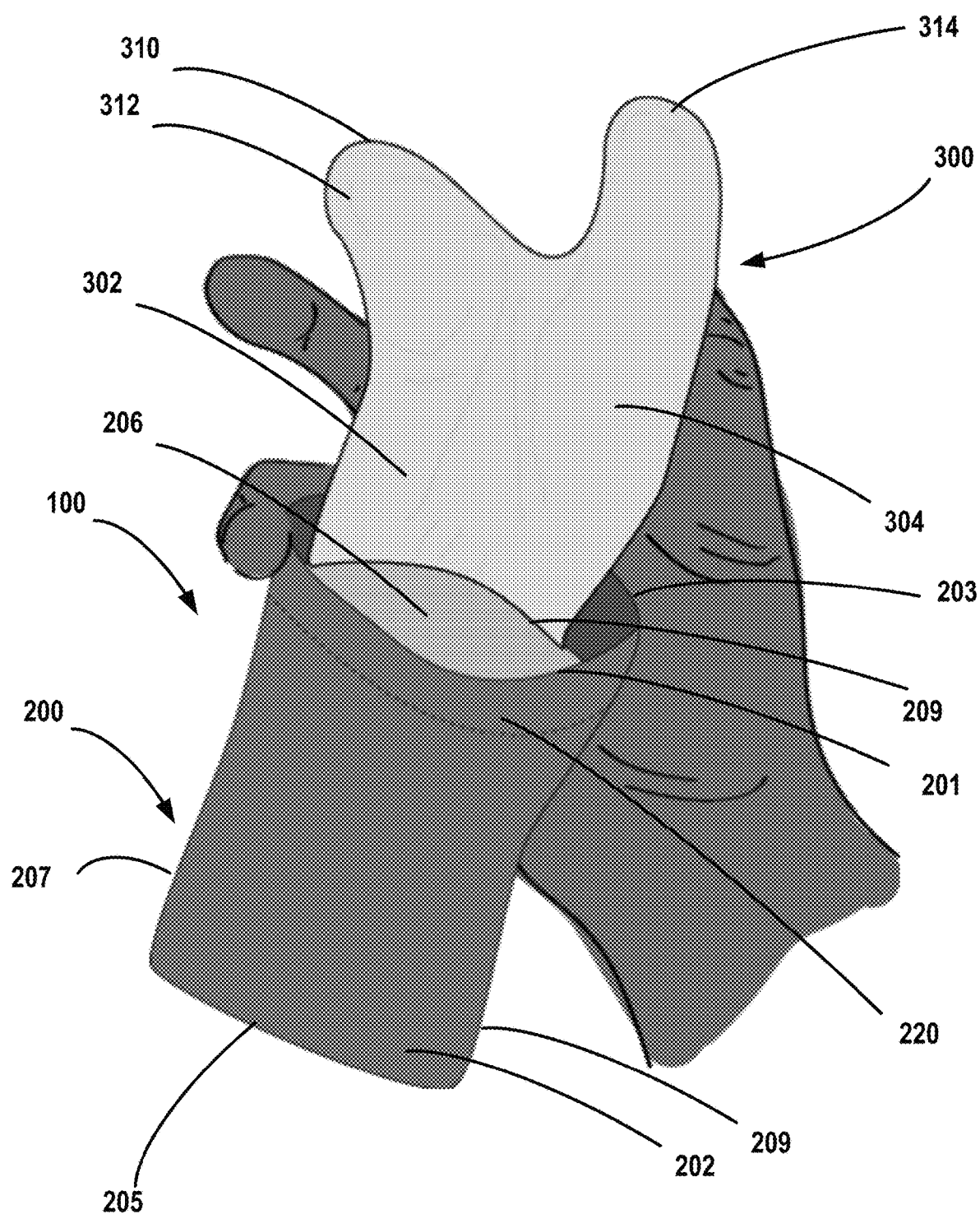
FIG. 1 illustrates a front perspective view of an exemplary orthodontic device storage system in use, in accordance with aspects of the disclosure.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Also, while the terms "top," "bottom," "front," "back," "side," "distal," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Plurality," as used herein, indicates any number greater than one, either disjunctively or conjunctively, as necessary, up to an infinite number.

In general, this disclosure relates to an orthodontic device storage system that is configured to store an orthodontic device and assist a user to more easily remove an orthodontic device. An orthodontic device can include any device a user may insert and remove from their mouth. This can include, for example, orthodontic aligners, dental prostheses, retainers, mouthguards, dentures, etc.

FIGS. 1-5 illustrate a storage system 100 for an orthodontic device. As shown in FIGS. 1-5, the storage system 100 can include a case 200. The case as shown in FIGS. 1-5 is composed of a flexible material such as a textile, fabric, or cloth. However, as will be discussed below in other embodiments the case may be made of one or more rigid materials.

As shown in FIGS. 1-5, the case 200 includes a first side 202 and a second side 204 engaged with the first side 202. The case 200 can also include a top end 203, bottom end 205, a first edge 207, and a second edge 209. The first side 202 and the second side 204 are engaged such that they form an interior pocket 206. As shown in FIGS. 1-5 the first side 202 and the second side 204 can be engaged on the bottom end 205, the first edge 207, and the second edge 209 such that an opening 201 to the interior pocket 206 is formed in the top end 203.

As shown in FIGS. 1-5, the storage system 100 can also include a removal tool 300. The removal tool can include a removal cloth 302 having a front side 304, and a back side 306. The removal cloth 302 includes a first end 308 engaged with the case 200, and a second end 310. As shown the removal cloth 302 may be engaged on an inside portion of either the first side 202 or the second side 204 of the case 200. In some embodiments the removal cloth 302 may be sewn to the case or may form a continuous portion of the first side 202 and/or the second side 204. In other embodiments, however, the removal cloth 302 may be removably engaged with the case.

Figure 2:
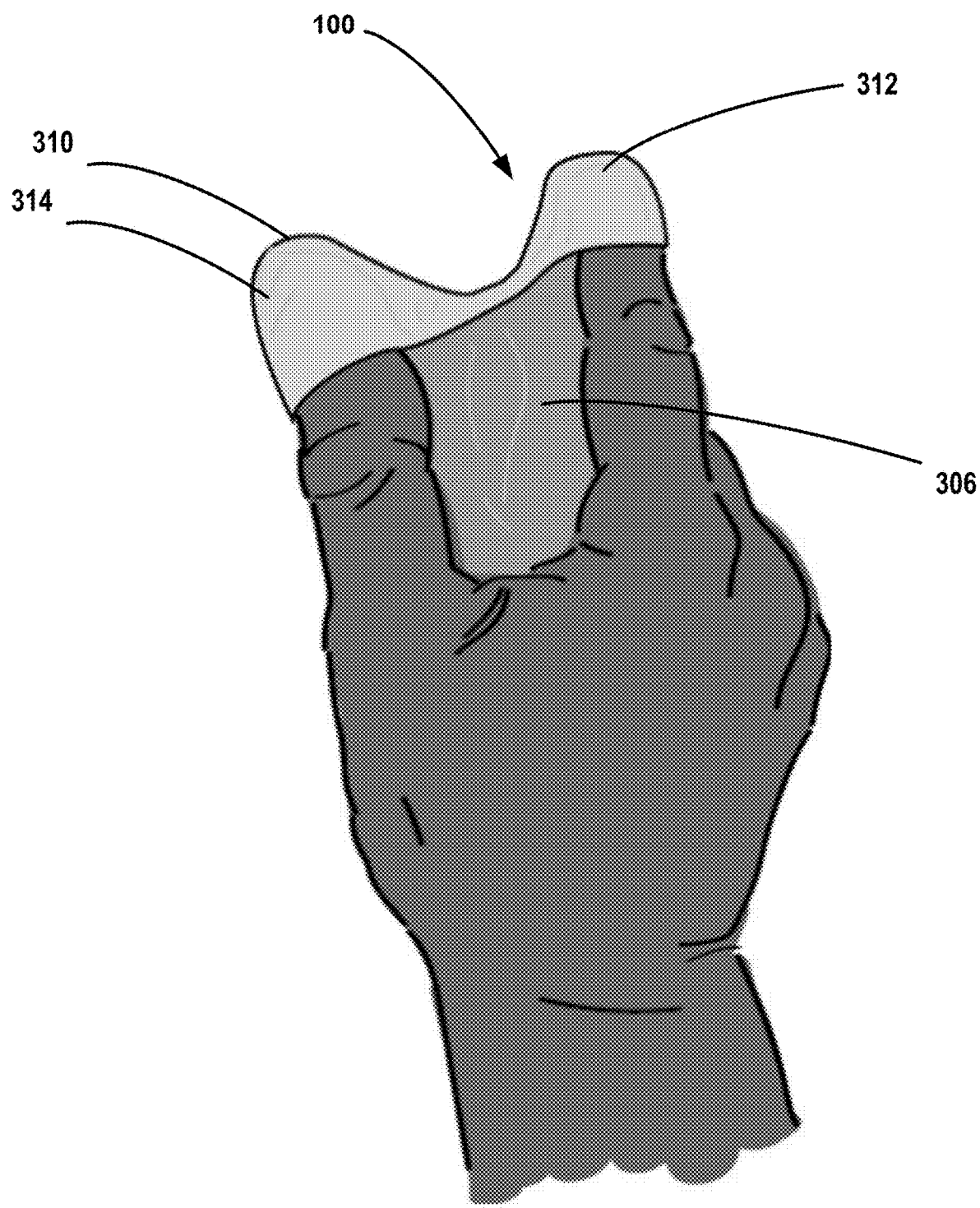
FIG. 2 illustrates a back perspective view of the orthodontic device storage system of FIG. 1 in use, in accordance with aspects of the disclosure.

As shown in FIGS. 1-4 the removal cloth may generally form a V-shape and may include a first pocket 312 forming a portion of the second end 204 and a second pocket 314 forming a portion of the second end 204. The first pocket 312 may be sized to fit a user's first finger and surround the tip of a user's first finger and the second pocket 314 may be sized to fit a user's second finger and surround the tip of a user's second finger. As best shown in FIGS. 1 and 2, a user can insert a finger into each of the first pocket 312 and the second pocket 314. The user can pinch the orthodontic device between their fingers inserted in the first and second pockets 312, 314 to remove the orthodontic device. Once the orthodontic device has been removed from the user's mouth, the user can insert the orthodontic device along with the removal cloth 300 into the interior pocket 206 of the case 200. Advantageously the removal cloth 300 along with the orthodontic device can be completely stowed within the case 200.

To use the storage system 100 a user may adhere to the following steps: (1) the user opens the case 200 and extracts the removal tool 300; (2) the user dons the removal tool 300 by inserting a finger into each of the first and second pockets 312, 314; (3) Using prehension between the first and second pockets 312, 314, the user grips the orthodontic device; (3) the removal tool 300 provides sufficient friction on the surface of orthodontic device to grasp, and in certain cases slightly torque, and remove the orthodontic device from the user's mouth; and (5) the user then may place the orthodontic device and the removal tool 300 into the case 200 in generally a single motion.

The case 200 can also include a closure mechanism 220 to close the opening 201 such that the orthodontic device cannot accidently fall out of the case 200. The closure mechanism can include any suitable closure device. In some embodiments the closure mechanism can include, for example, elastic, a drawstring, a zipper, one or more magnets, one or more buttons, and a snap fit connection. The case 200 can also include an attachment device 230 that can be used to attach or hang the case to other items. The attachment device 230 could include, for example, a loop of material, a carabiner, a ring, a clip, or other suitable device The case 200 and the removal tool 300 can be made of any suitable material. For example, the case 200 and the removal tool 300 can be made of natural or synthetic materials and the case 200 and the removal tool 300 can be made of the same material or different materials. While the term removal cloth 302 has been used herein to describe a portion of the removal tool 300, the removal tool 300 can be formed of other flexible materials that may not be cloth materials. Each of the case 200 and the removal tool 300 can be made of materials which may have antimicrobial materials or materials coated with antimicrobial agents. Further, in some embodiments, the case 200 and the removal tool 300 can be made of materials that allow for easy washing of the storage system 100 such as by washing it in a dishwasher or laundry machine. In some embodiments the removal tool 300 can include additional treatments which may allow a user to more easily grip the orthodontic device such as by including gripping dots on the removal tool 300.

Figure 3:
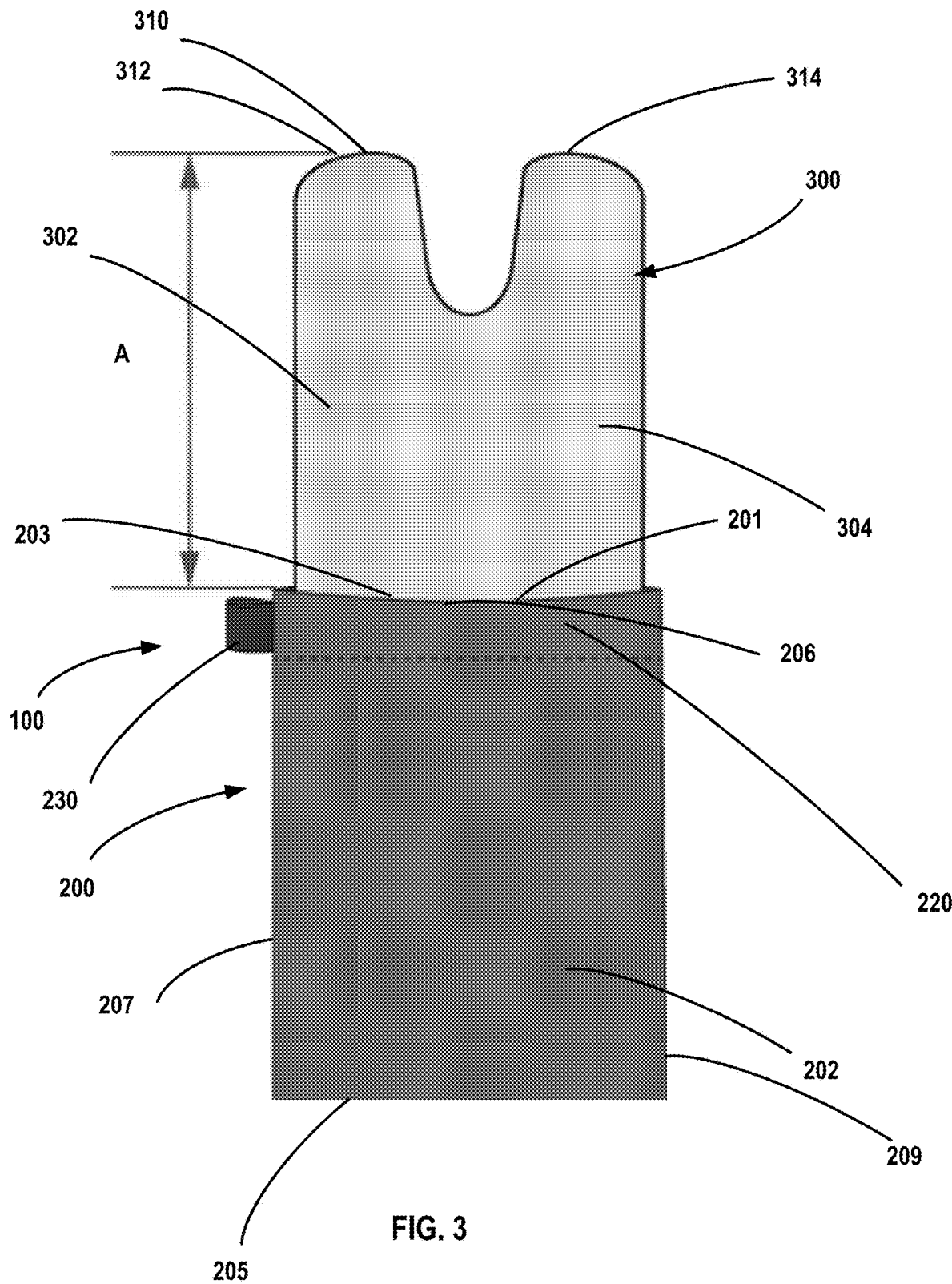
FIG. 3 illustrates a front view of the orthodontic device storage system of FIG. 1, in accordance with aspects of the disclosure.
Figure 4:
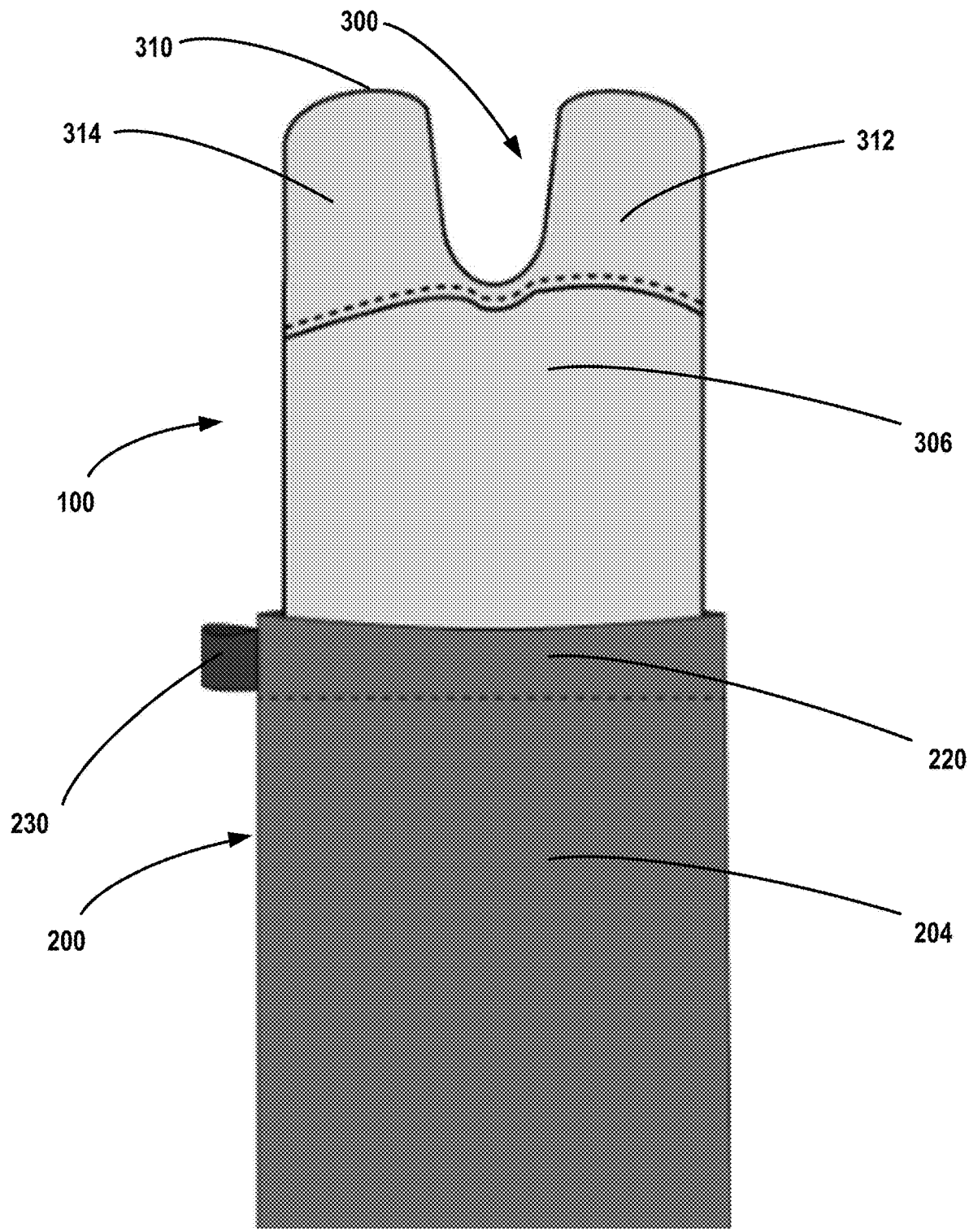
FIG. 4 illustrates a back view of the orthodontic device storage system of FIG. 1, in accordance with aspects of the disclosure.
Figure 5:
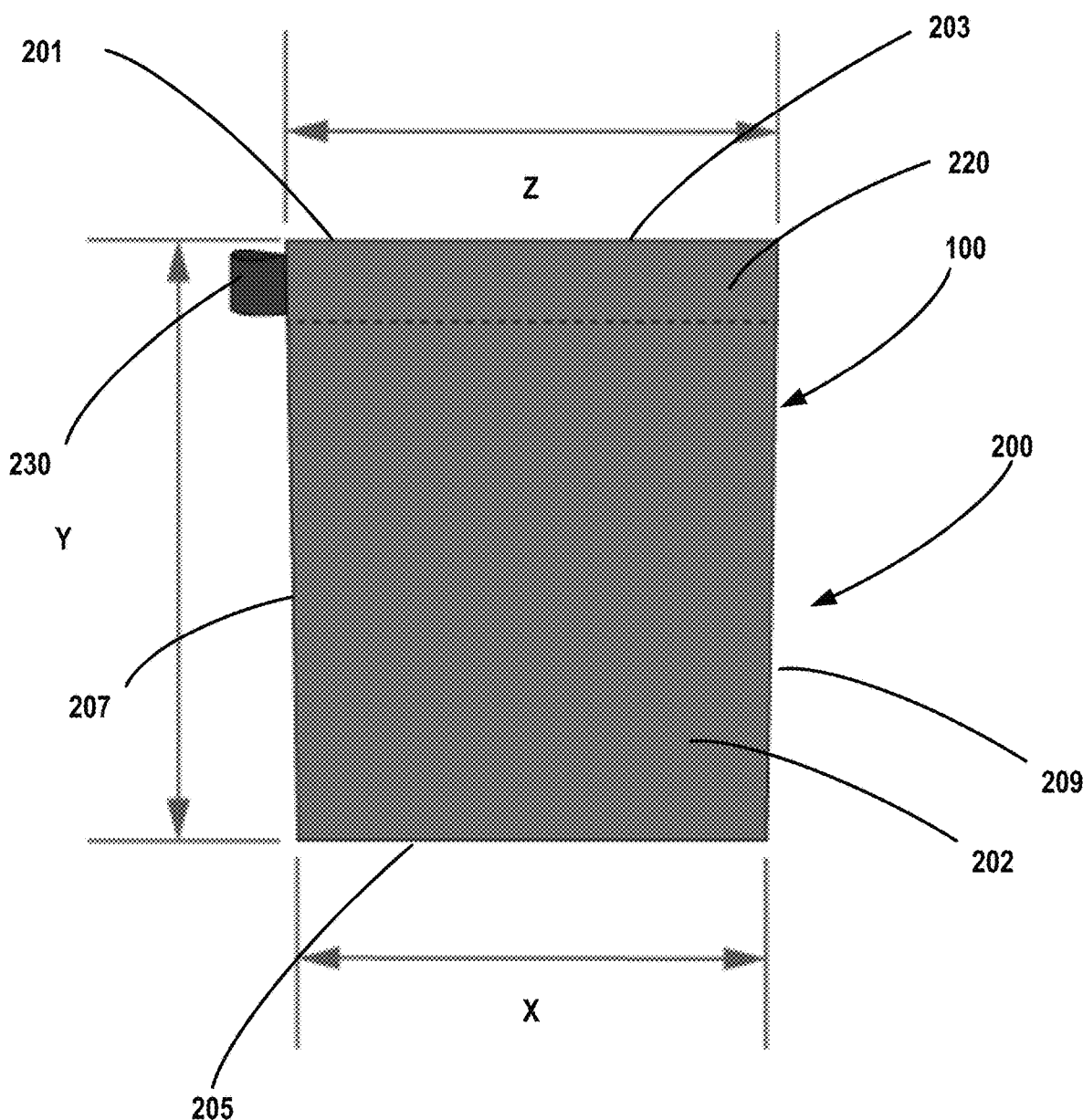
FIG. 5 illustrates a front view of the orthodontic device storage system of FIG. 1 with the removal tool inside the case, in accordance with aspects of the disclosure.

In certain embodiments the case 200 and removal tool 300 can have certain dimensions that may be advantageous to the usability of the storage system 100. As best shown in FIGS. 3 and 5. The removal tool 300 may have a length "A". The case 300 may have a width "X" measured at the bottom end 205, a height "Y", and a width "Z" measured at the top end 203. In some embodiments, the width "Z" measured at the top end 203 may be greater than the width "X" measured at the bottom end 205. This may allow a user to more easily insert and remove the orthodontic device from the case 200. Additionally, in some embodiments, the length of the removal tool "A" may be less than the height "Y" of the case 200 which may allow a user to more easily stow the removal tool 300 and the orthodontic device inside the case 200. While the storage system 100 may have any suitable dimensions, in some embodiments the length "A" can be about 90 mm or in the range of about 70 mm-110 mm; the width "X" can be about 85 mm or in the range of about 65 mm-105 mm; the height "Y" can be about 110 mm or in the range of about 90 mm-130 mm, and the width "Z" can be about 90 mm or in the range of about 70 mm-110 mm.

Figure 6:
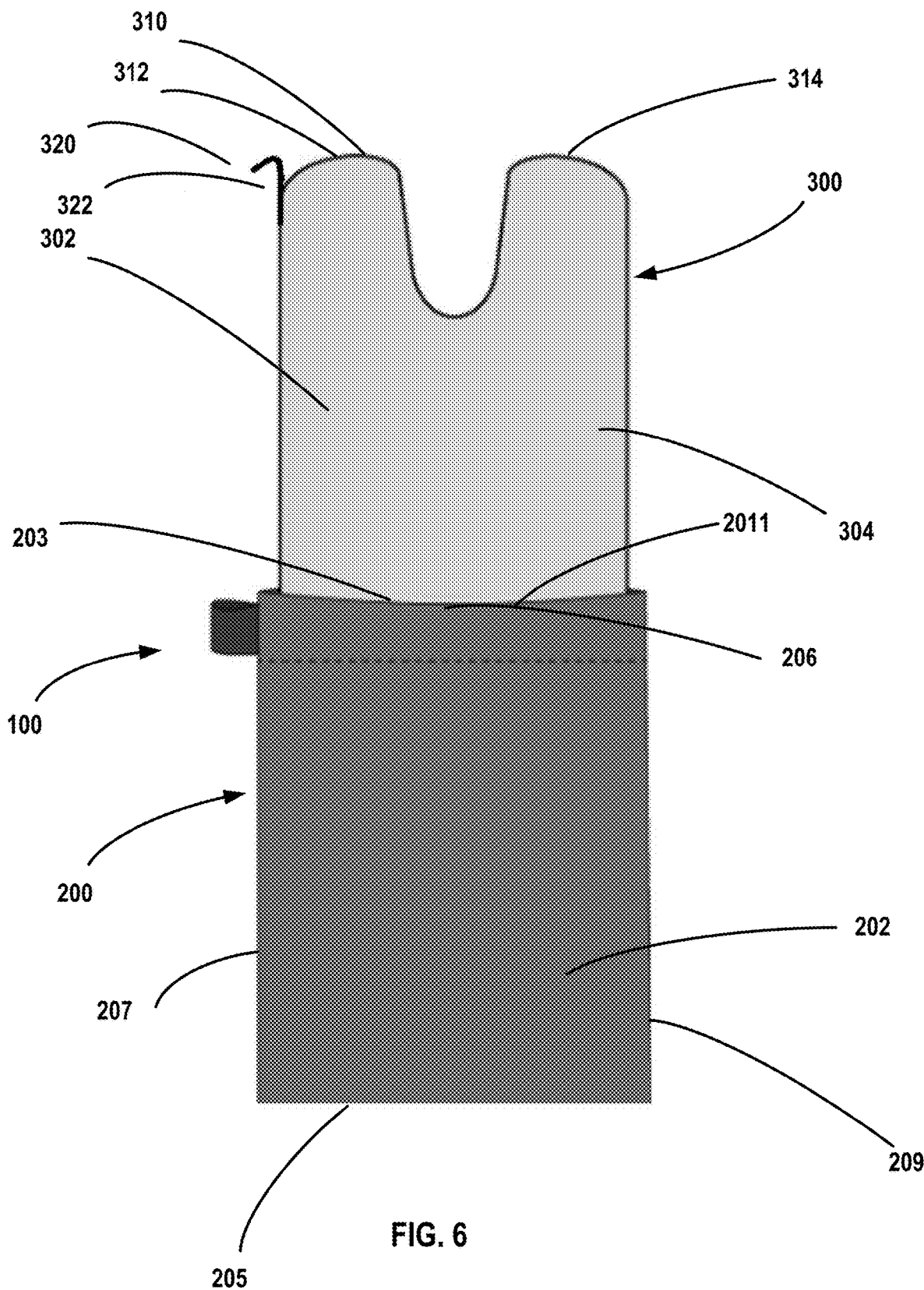
FIG. 6 illustrates a front view of another exemplary orthodontic device storage system, in accordance with aspects of the disclosure.

In some embodiments the storage system 100 can include other implements which may assist in removal of an orthodontic device. In some embodiments the removal tool 300 may include a removal instrument 320 extending from the removal cloth 302. For example, as shown in FIG. 6, the removal tool 300 can include a hook portion 322 extending from the removal cloth 302. The hook portion 322 can be made of any suitable material including plastic. In such embodiments, a user could use the hook portion to assist in removal of the orthodontic device by inserting the hook portion 322 under a portion of the orthodontic device to loosen the orthodontic device from the user's mouth.

Figure 7:
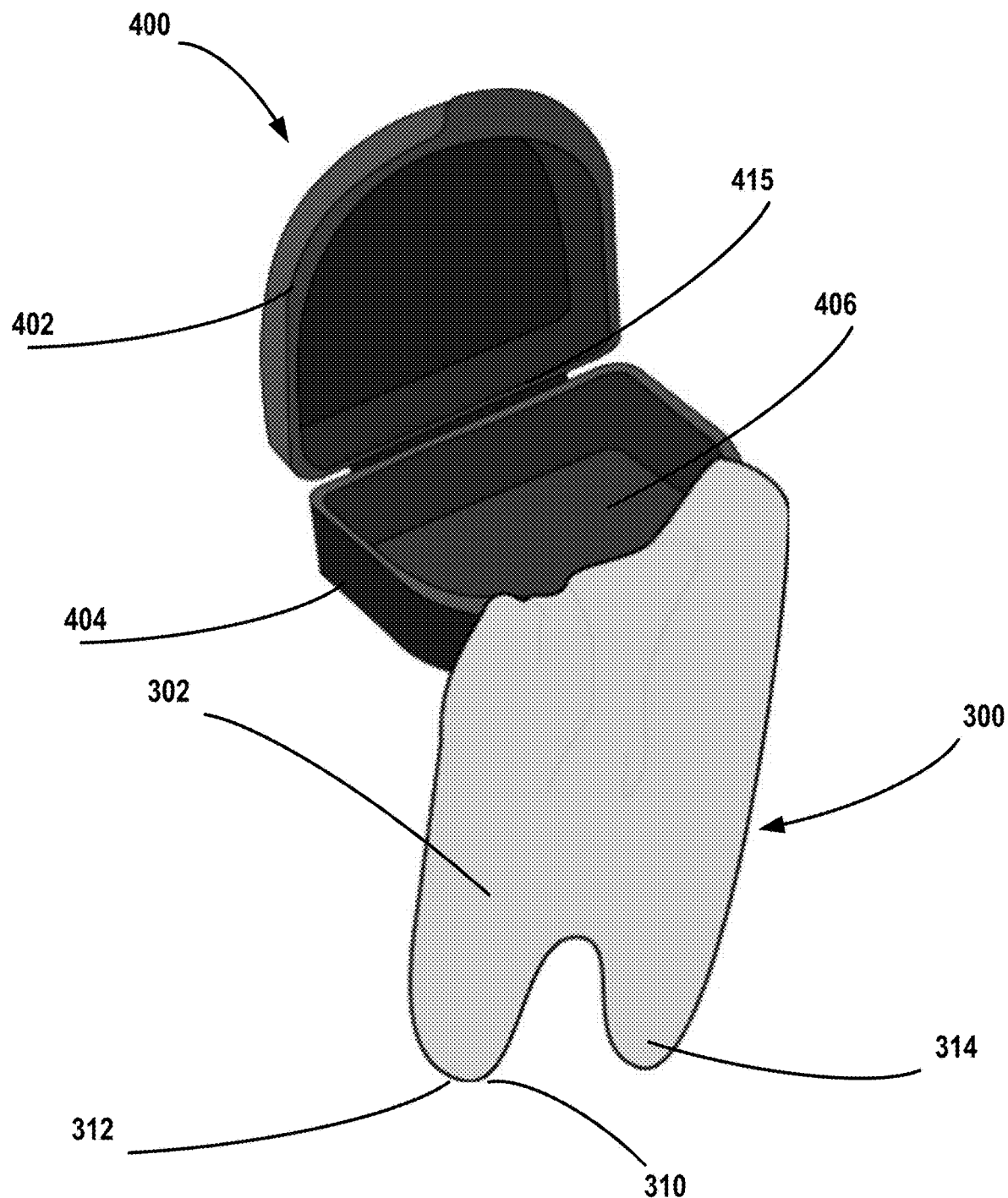
FIG. 7 illustrates a front perspective view of another exemplary orthodontic device storage system, in accordance with aspects of the disclosure.
Figure 8:
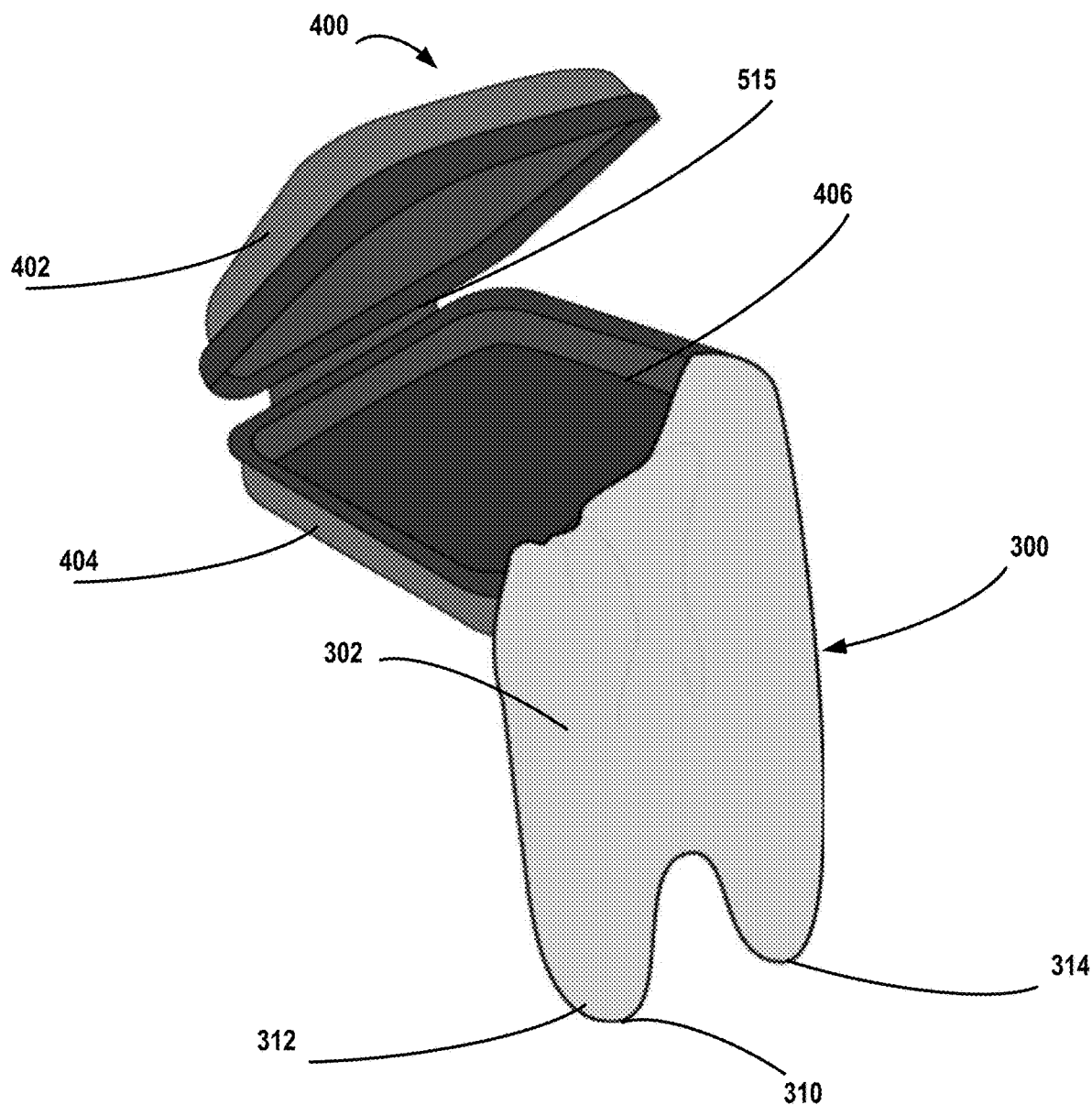
FIG. 8 illustrates a front perspective view of another exemplary orthodontic device storage system, in accordance with aspects of the disclosure.

As described and shown in FIGS. 1-6, the case 300 can be formed of a flexible material. However, in other embodiments, the case 300 can be formed of a rigid material which may be more suitable for storage of certain orthodontic devices. As shown in FIG. 7 the case 400 can be formed of a rigid plastic material and as shown in FIG. 8 the case 500 can be formed of a rigid or firm material such as foam. The rigid cases 400, 500 shown in FIGS. 7-8 can have similar components to the flexible case 200 shown above. The cases 400,500 can include a top portion 402, 502 and a bottom portion 404, 504. The top portion 402, 502 and the bottom portion 404, 504 can be connected by a hinge portion 415, 515. Similar to the flexible case 200 described above, the top portion 402, 502 and the bottom portion 404, 504 form an interior pocket 406, 506. The removal tool 300 can be engaged with an interior portion of either the top portion 402, 502 or the bottom portion 404, 504. Similarly, a user may store the orthodontic device and the removal tool 300 in the interior pocket 406, 506 of the case 400, 500. Additionally, as described above, the case 400, 500 can include a suitable closure mechanism such that the top portion 402, 502 and the bottom portion 404, 504 can be engaged together. The closure mechanism for cases 400, 500 can include, for example, a zipper, one or more magnets, one or more buttons, or a snap fit connection The various embodiments described herein enable connection of an articulating boom arm. It is also understood that in other embodiments, the various devices, components, and features of the boom arm described herein may be constructed with similar structural and functional elements having different configurations, including different ornamental appearances. Still other benefits may be recognized by those skilled in the art. Accordingly, while the specific embodiments have been illustrated and described, numerous modifications come to mind without significantly departing from the spirit of the invention and the scope of protection is only limited by the scope of the accompanying claims.

What is claimed is:
1. A storage system for an orthodontic device, comprising:
a case, the case comprising:
  a first side;
  a second side engaged with the first side and forming an interior pocket between the first side and the second side;
a removal tool, the removal tool comprising:
  a removal cloth having a front side, a back side, a first end engaged with the case, and a second end;
  a first pocket forming a portion of the second end;
  a second pocket forming a portion of the second end;

wherein the first pocket is sized to fit a user's first finger and wherein the second pocket is sized to fit a user's second finger; and wherein the removal cloth generally forms a V-shape.

2. The storage system for an orthodontic device of claim 1, wherein the case includes a closure mechanism.

3. The storage system for an orthodontic device of claim 2, wherein the closure mechanism is a drawstring.

4. The storage system for an orthodontic device of claim 2, wherein the closure mechanism is a zipper.

5. The storage system for an orthodontic device of claim 2, wherein the closure mechanism is magnetic.

6. The storage system for an orthodontic device of claim 2, wherein the closure mechanism includes one or more buttons.

7. The storage system for an orthodontic device of claim 2, wherein the closure mechanism is a snap fit connection.

8. The storage system for an orthodontic device of claim 1, further comprising a removal instrument extending from the removal cloth.

9. The storage system for an orthodontic device of claim 8, wherein the removal instrument comprises a hook portion.

10. A storage system for an orthodontic device, comprising:
   a case, the case comprising:
      a first side;
      a second side engaged with the first side and forming an interior pocket between the first side and the second side;
   a removal tool, the removal tool comprising:
      a removal cloth having a front side, a back side, a first end engaged with the case, and a second end;
      a first pocket forming a portion of the second end;
      a second pocket forming a portion of the second end;
   wherein the first pocket is sized to fit a user's first finger and surround a tip of the user's first finger and wherein the second pocket is sized to fit a user's second finger and surround the tip of a user's second finger;
   wherein the removal cloth generally forms a V-shape; and
   wherein the case includes a closure mechanism.

11. The storage system for an orthodontic device of claim 10, wherein the closure mechanism is a drawstring.

12. The storage system for an orthodontic device of claim 11, wherein the closure mechanism is a zipper.

13. The storage system for an orthodontic device of claim 11, wherein the closure mechanism is magnetic.

14. The storage system for an orthodontic device of claim 11, wherein the closure mechanism includes one or more buttons.

15. The storage system for an orthodontic device of claim 11, wherein the closure mechanism is a snap fit connection.

16. The storage system for an orthodontic device of claim 10, further comprising a removal instrument extending from the removal cloth.

17. The storage system for an orthodontic device of claim 16, wherein the removal instrument comprises a hook portion.

18. The storage system for an orthodontic device of claim 10, wherein case is formed of a rigid material.

19. The storage system for an orthodontic device of claim 10, wherein the removal tool is removably engaged with the case.

* * * * *